Nov. 14, 1950  M. J. MURPHY  2,529,511
DEFERRED ACTION BATTERY
Filed Aug. 14, 1947  2 Sheets-Sheet 1
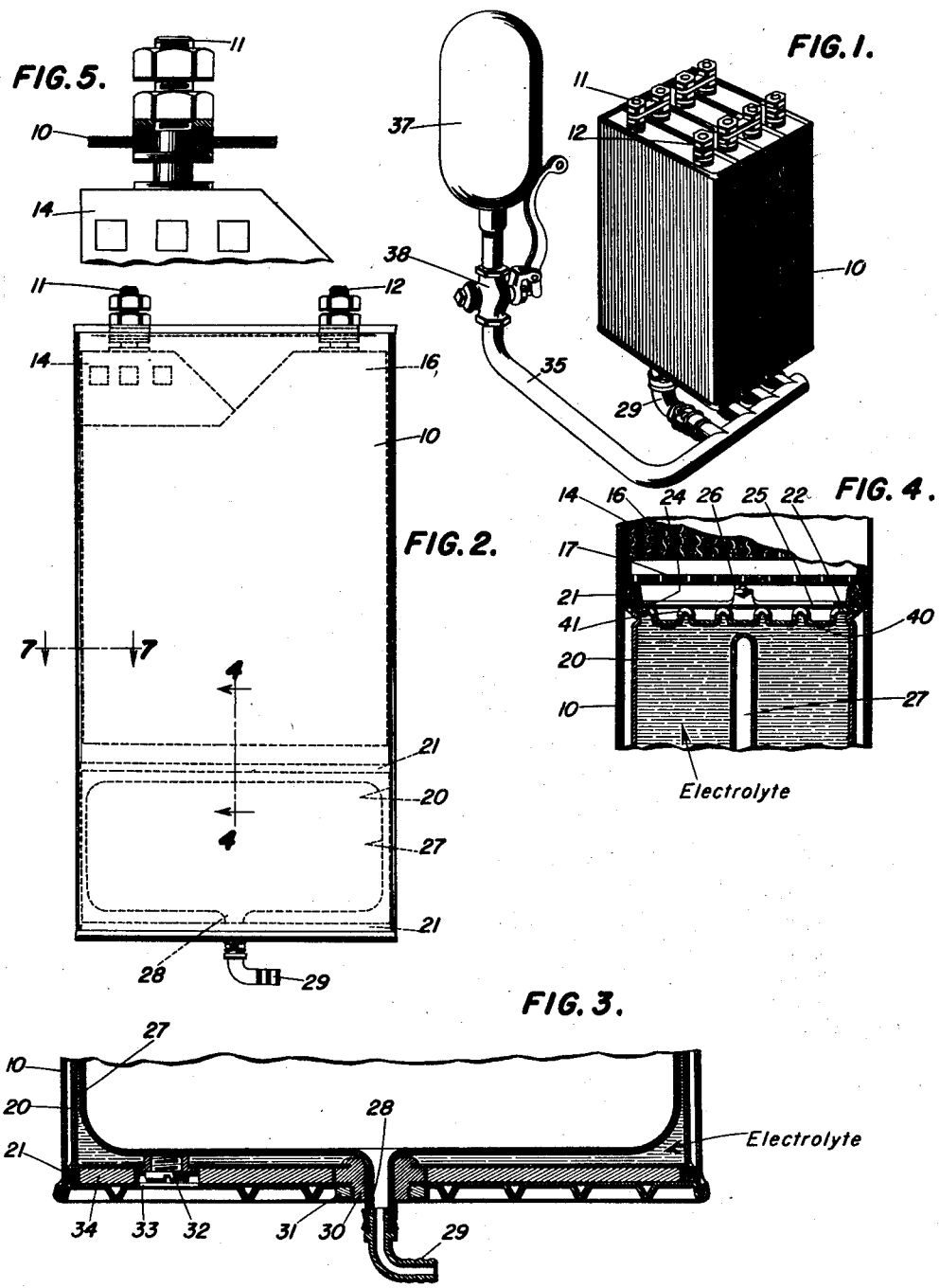
INVENTOR
MOYES J. MURPHY
BY
ATTORNEY Nov. 14, 1950 M. J. MURPHY 2,529,511
DEFERRED ACTION BATTERY Filed Aug. 14, 1947 2 Sheets-Sheet 2

INVENTOR
MOYES J. MURPHY

BY

ATTORNEY

Patented Nov. 14, 1950

2,529,511

UNITED STATES PATENT OFFICE 2,529,511

DEFERRED ACTION BATTERY

Moyes J. Murphy, Arcadia, Calif.

Application August 14, 1947, Serial No. 768,678

4 Claims. (Cl. 136—90)

(Granted under the act of March 3, 1883, as amended April 30, 1928; 370 O. G. 757)

This invention relates to liquid supply systems, and particularly to improved means for controlling the introduction of electrolyte into the individual cells of wet batteries.

An important object of the invention is to provide an improved battery of the indicated character comprised of hermetically sealed individual containers, each container having a working or cell portion including two sets of plates (to which positive and negative terminals are electrically connected in the conventional manner) and an electrolyte receptacle preferably housed in the same container but normally isolated from the working cell portion until such time as it is desired to activate the battery.

Previous constructions of the same general character have usually involved the retention of the electrolyte in a separate receptacle which is broken in one manner or another when it is desired to activate the battery, the electrolyte being then allowed to flow into the cells under gravity. Under some conditions of use, particularly in rapidly moving objects or vehicles, it will be recognized that the force of gravity may not be effective to cause the electrolyte properly to enter the cell, while under other conditions, gravity, when effective, may not be rapid enough in its effect to meet the desired conditions, particularly when it is desired to start electrical machinery with great rapidity upon release of the electrolyte.

The present invention aims to provide means which is independent of the force of gravity, which assures proper injection of the electrolyte in a rapid and positive manner without regard to the position or relative movement of the battery, and which is simple and positive in its action, and which, further, requires no reliance upon the breaking of a receptacle.

Other objects and advantages will be apparent upon a consideration of this disclosure in its entirety.

In the drawings, Figure 1 is a perspective view of a battery provided with electrolyte charging means constructed in accordance with the present invention;

Figure 2 is a side elevational view of a single cell of the battery;

Figure 3 is a fragmentary sectional elevation of the lower portion of one of the cells, on a larger scale;

Figure 4 is a view partly in side elevation and partly in vertical section of the central portion of the cell assembly, taken substantially on the line 4—4 of Figure 2 and looking in the direction of the arrows;

Figure 5 is a fragmentary sectional elevational view of the upper portion of one of the plates with its terminal connection;

Referring particularly to Figs. 1-8 inclusive, each cell will be seen to be housed in a container or case 10, which may be hermetically sealed and formed of any suitable material, such as plastic or hard rubber. Terminals, as 11, 12, project in the conventional manner from the top of the case and are electrically connected to the plates 14, 16. The construction and arrangement of these parts form no part of my present invention, and accordingly will not be described in detail. The battery may be either of the primary or secondary type and the invention is applicable, as will be apparent, not only to any battery which employs a liquid electrolyte, but to other liquid-containing cells and devices.

The case 10 is deeper than the plates 14, 16, to an extent sufficient to accommodate in the bottom or sump portion thereof the entire quantity of electrolyte required by the battery in operation, the electrolyte when contained in the sump being entirely out of contact with the plates. A transverse reticulated grid element 17 defines a partition between the upper working portion containing the plates, and the sump or bottom portion.

Figure 6:
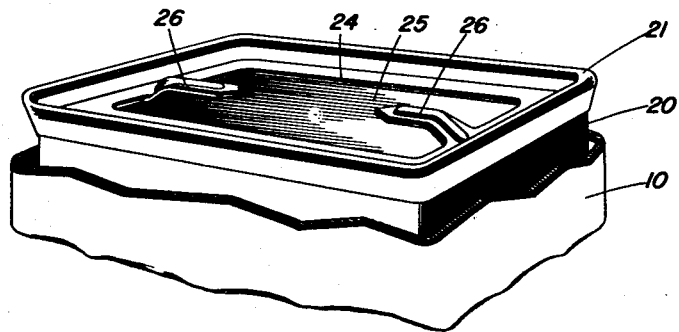
Figure 6 is a fragmentary perspective view of the upper portion of the electrolyte container, also showing a portion of the outer receptacle.
Figure 7:
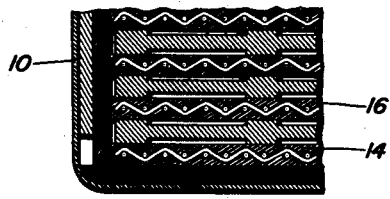
Figure 7 is a fragmentary horizontal sectional view taken substantially on line 7—7 of Fig. 2 and looking in the direction of the arrows.
Figure 8:
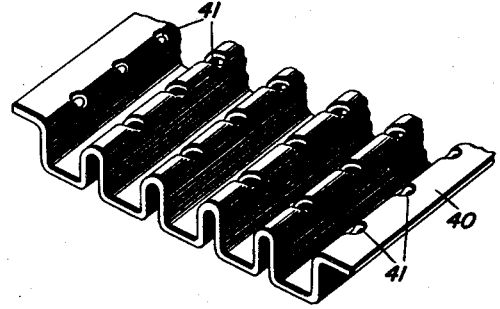
Figure 8 is a perspective view of one of the reinforcing and shielding elements.

A separate inner receptacle or can 20 is provided for the electrolyte. Can 20 is adapted to be filled separately and installed as a unit in and to substantially fill, the sump of the casing 10. The can 20 is formed of sheet metal, its top and bottom being sealed thereto by a rolled and soldered marginal bead 21 in the conventional manner. The top 22 is centrally cut away to form a relatively large opening 24, which is sealed by a flexible membrane 25 of rubber or the like. Pointed projections 26 integral with the top 22 of the can extend inwardly over the membrane 25 as best shown in Fig. 6, the members 26 being so formed that when the membrane is distended upwardly by increased pressure within the can, the pointed extremities of the members 26 tear the membrane to permit the electrolyte to escape from container 20 and move into contact with the plates in case 10.

A bladder 27 is arranged within the container 20 and provided with a stem 28 adapted to project therefrom and from the case 10 to permit inflation of the bladder from an outside source of pressure, a nipple 29 being provided to facilitate connection to such sources. The stem 28 is sealed in the bushing 30, which is in turn sealed with respect to the bottom of the can 20. Bushing 30 also projects through the bottom of the case 10, the lower extremity of the bushing being provided with threads so that a nut 31 may be applied thereto. When tightened, the nut secures container 20 in the case 10, these parts and the bladder 27 being thus rigidly secured in their relative positioning. A filler opening is provided in the bottom of the can 20, a screw plug 32 normally closing this opening and being accessible through an access hole 33 in the bottom of the case 10. A reinforcing filler element 34, also apertured to permit access to the filler plug 32, is interposed between the bottoms of the can 20 and case 10, as shown in Fig. 3.

The nipple 29 is adapted to be connected as by tubing 35 to a source of air under pressure such as the flask 37, a valve 38 being provided to control the admittance of air to the bladder 27. In assembling the various components of the battery the can 20 is filled with electrolyte while the bladder 27 is in the collapsed condition, and the bladder remains collapsed until it is desired to activate the battery. At such time, the bladder is distended by the admittance of air thereto. The electrolyte is forced upwardly, bulging and tearing the membrane 25 against the pointed projections 26, and then moving upwardly through the tear into the working or cell space above the grid 17, to engage and bridge the plates and thus initiate the galvanic action of the battery.

In order to prevent the bladder from blocking flow of the electrolyte through the grid 17, a perforated shield 40 is provided within the can 20, directly beneath the top and membrane portions 25 thereof and so formed that the perforations, through which the electrolyte escapes to the cell space above, cannot be sealed off by the expanded bladder, while the bladder is at the same time prevented from contacting the tearing members 26. For this purpose the perforations 41 in the shield are located at the tops of relatively narrow channels which open downwardly toward the interior of the can 20 and are so narrow that the bladder cannot be stretched sufficiently to extend into and seal off the perforations 41 in the channels, under the working pressure which is applied to the bladder.

Since the entire unit is hermetically sealed, the case 10 must be of sufficient strength to stand the pressure created by the expansion of the bladder, as this pressure is transmitted to the walls of the case the air in the latter being compressed as the electrolyte rises.

Figure 9:
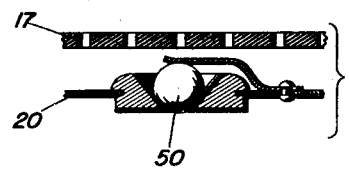
Figure 9 is a fragmentary sectional elevational view of a modified structure involving valve-type electrolyte-retaining means.

In the embodiment of Figures 1 to 8, inclusive, just described, the electrolyte remains in contact with the plates only so long as the bladder is distended. In the modified construction illustrated in Figure 9, however, a check valve 50 of the conventional ball type is provided in the top of can 20 to prevent return of the electrolyte. If desired, the membrane may be omitted in this embodiment, and the valve relied upon for sealing, although this will be recognized as a matter of choice.

The invention herein described may be manufactured and used by or for the Government of the United States of America for governmental purposes without the payment of any royalties thereon or therefor.

I claim:

1. An electrolytic cell having a working chamber containing a set of battery plates, and a supplemental container portion for the electrolyte, a normally collapsed distensible bladder within said supplemental container portion, a tearable membrane separating the working chamber from its complemental portion, tearing means to rupture the membrane by the displacement of the electrolyte upon distention of the bladder, and a shield dividing the working chamber from said supplemental container portion, said shield being formed with narrow channels and having perforations along the channels remote from the bladder to prevent the bladder from sealing off the perforations.

2. An electrolytic cell having a working chamber containing a set of battery plates, and a supplemental container portion for the electrolyte, pressure-releasable closure means initially preventing communication between the supplemental container portion and the working chamber, said pressure releasable closure means comprises a distortable membrane, and puncturing means for the membrane adapted to be engaged by such membrane when the latter is distorted to a predetermined extent, to puncture and thereby form an opening in the membrane.

3. An electrolytic cell having a working chamber containing a set of battery plates, and a supplemental container portion for the electrolyte, closure means between the working chamber and said container portion, a displaceable membrane, forming a part of said closure means, and perforating means engageable by the membrane when the latter is displaced and adapted to tear the membrane.

4. A battery cell comprising a case, a set of battery plates in one end of the case leaving the other end in the form of a sump, there being a filling of electrolyte in the sump, a tearable membrane fixed across the case to seal and partition the electrolyte from the plates, an initially collapsed but distensible bladder submerged in the electrolyte, at least one sharp point situated between the membrane and the plates on which to tear the bladder when distended, a source of pressure fluid from which to distend the bladder, and a valve controlling a connection between said source and the bladder.

MOYES J. MURPHY.

REFERENCES CITED

The following references are of record in the file of this patent:

UNITED STATES PATENTS

| Number | Name | Date |
| --- | --- | --- |
| 1,218,847 | Firey | Mar. 13, 1917 |
| 1,503,279 | Nixon | July 29, 1924 |
| 2,404,144 | Riggs et al. | July 16, 1946 |

FOREIGN PATENTS

| Number | Country | Date |
| --- | --- | --- |
| 76,333 | Austria | May 10, 1919 |
| 400,572 | France | July 31, 1909 |
| 19,623 | Great Britain | Dec. 28, 1906 |